April 23, 1935. T. I. POTTER 1,998,790
SEAL FOR ROTARY SHAFTS
Filed Sept. 23, 1933
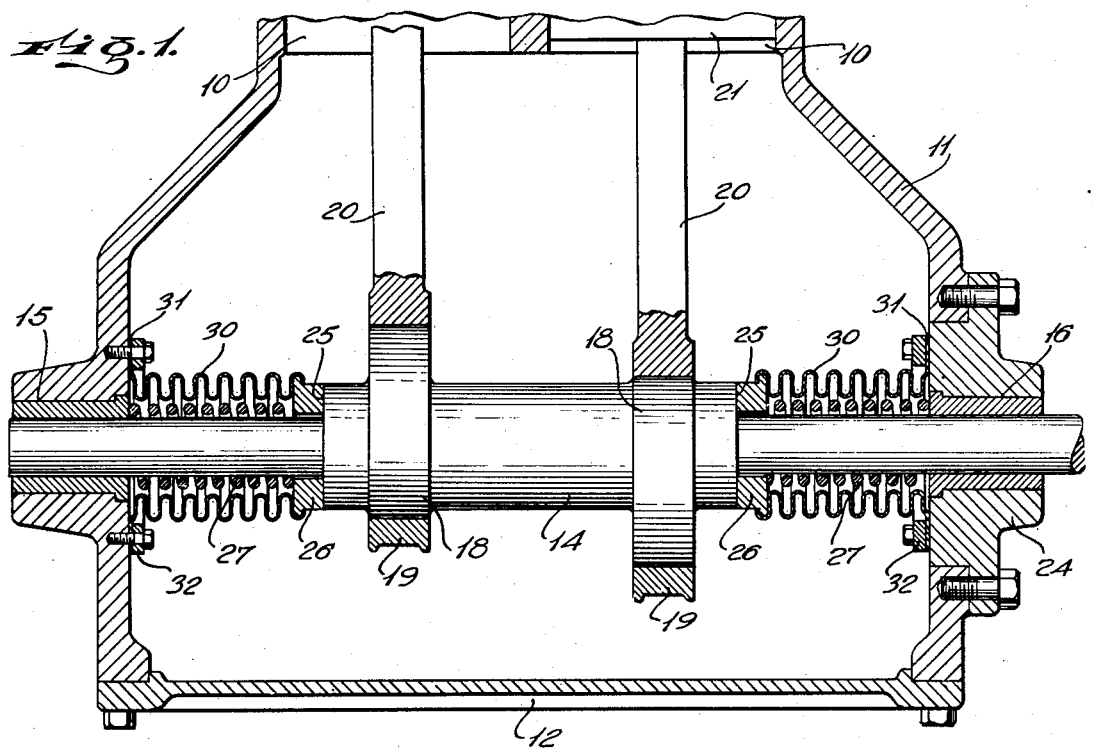
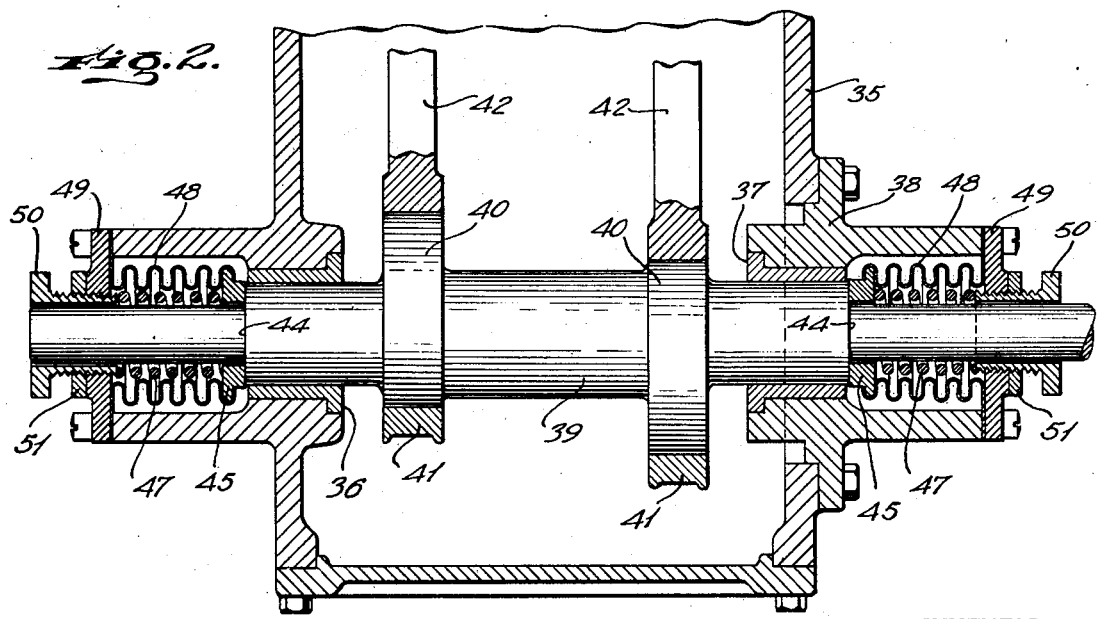
INVENTOR.
THOMAS I. POTTER
BY
ATTORNEY Patented Apr. 23, 1935

1,998,790

UNITED STATES PATENT OFFICE 1,998,790

SEAL FOR ROTARY SHAFTS

Thomas I. Potter, Buffalo, N. Y.

Application September 23, 1933, Serial No. 690,667

5 Claims. (Cl. 286—11)

The present invention relates to seals for rotary shafts penetrating chambers in which it is desired to maintain pressures differing materially from surrounding pressure conditions.

The invention is applicable in cases where partial vacuums are to be maintained as well as in cases where high pressures are to be maintained.

My invention will be found particularly useful in sealing the bearings of drive shafts of compressors, such as employed in refrigerating machinery. It is essential in such machinery not only to maintain pressure but more particularly to prevent leakage of refrigerant fluids.

Various forms of seals are known to the art. One of the most successful of these comprises a sealing ring or collar accurately finished to form a gas tight fit against a shoulder on the shaft. This ring is spring-pressed against its seat to maintain a perfect seal and a resilient support is provided for the ring by an expansible metal bellows which is sleeved over the shaft and sealed fluid-tight to the ring and to the bearing. The ring thus forms a floating extension of the main bearing to which it is resiliently attached so that it may adapt itself to slight variations or inaccuracies in the parts and will wear uniformly.

It has been common practice heretofore to provide a seal of this type at only one side of the compressor, the drive shaft being supported in a blind bearing at the other side. In other words, the shaft penetrates only one side of the compressor and the bearing on the other side does not open through to the outside atmosphere. This confines the possibility of leakage to one bearing only.

While this system has operated satisfactorily for low pressures it has given trouble when applied to high pressure apparatus particularly where the high pressure side of the compressor is in the crank case. Fluid entering the blind bearing produces an end-thrust on the shaft which must be borne by the spring-pressed sealing ring. While this pressure varies through a wide range the spring backing for the sealing ring must be stiff enough to resist the maximum end-thrust on the shaft that might be developed in the crank case. As a result an excessive amount of friction exists between the sealing ring and the bearing shoulder of the shaft which results in rapid wear and early breakdown.

An object of the present invention is to provide a novel sealing structure in which friction is reduced to a minimum, and in which, furthermore, the higher the pressure in the cylinder the less will the friction be.

A further object of the invention is to maintain a drive shaft in a balanced condition so as to eliminate any tendency for it to move axially out of the crank case. To this end I provide a bearing seal at each end of the shaft so that no unbalanced end-thrust will be exerted on the shaft by the fluid in the crank case.

Another object is to provide a structure in which the shaft will be exposed to atmospheric pressure at each end of the crank case so that there can be no pocket present at an end of the shaft to accumulate fluid and exert an end-thrust on the shaft.

It will be understood that the term "crank case" is used in its generic sense to include the chamber through which the drive shaft passes, whether such shaft be a crank shaft or a shaft formed with eccentrics, or a shaft on which gears or other pump or compressor elements are directly mounted.

With the above-named objects in view and others which may be inferred or specifically mentioned hereinafter, I shall describe two embodiments of my invention and thereafter the novelty and scope of the invention will be pointed out in the claims.

In the accompanying drawing:

Figure 1 is a view in vertical section through the crank case of a compressor illustrating one embodiment of my invention; and Fig. 2 is a similar view of another embodiment of my invention.

In Figure 1, I have illustrated the lower part of a compressor of the reciprocating piston type. A pair of cylinders 10 are shown as integrally connected to a crank case 11. The bottom of the crank case is closed by a plate 12 bolted thereto so that it may be removed to provide access to the interior of the crank case.

A drive shaft 14 passes through the crank case being supported in bearings 15 and 16 at opposite ends of the crank case. Formed on the shaft 14 are two eccentrics 18 which are engaged by straps 19 secured to connecting rods 20. The latter are connected at their upper ends to pistons 21 (only one of which is shown) which operate in the cylinders 10. The bearing 16 is formed in a removable bearing block 24 which is bolted to the crank case 11 closing an opening in the crank case large enough to pass the eccentrics 18 when assembling the structure.

The shaft 14 is formed with opposed outwardly facing steps or shoulders 25. Sealing rings 26 are pressed against the shoulders 25 by means of springs 27. The engaging faces of the ring 26 and shoulders 25 are highly finished so as to form fluid-tight fits. The rings 26 fit loosely about the drive shaft, so that they are permitted a certain amount of play to adapt themselves to the shoulders 25 should the latter wear unevenly and be not truly normal to the axis of the shaft.

Each ring 26 is connected by metal bellows 30 to the adjacent end wall of the crank case, the bellows being sleeved over the shaft and the spring 27 and having a fluid-tight connection at one end to the sealing ring and at the other end to the crank case. The latter connection is provided by forming the end convolution of the bellows with an annular flange 31 which is engaged by a clamping ring 32 bolted fast to the end wall of the casing. Strictly speaking the bellows at the left hand end, as viewed in Fig. 1, is clamped directly to the end wall of the crank case, while the bellows at the other end is clamped to the bearing block 24 which is in effect a continuation of the end wall of the casing.

In operation, fluid pressure in the crank case 11 has no avenue of escape except through the joints formed between the sealing rings 26 and the shoulders 25. This is prevented by providing a perfect fit at these joints and holding the sealing rings in engagement with the shoulders 25 by means of the springs 27. It will be clear that the shaft 14 floats axially between the sealing rings since the fluid in the crank case can exert no unbalanced end-thrust on the shaft. Consequently the springs 27 need only be strong enough to hold the sealing rings in place against any tendency of the bellows 30 to retract under the maximum pressure of the fluid in the chamber 11. Should there be, by any remote chance, a slight leakage of fluid through either of the joints 25 there would be no opportunity for this fluid to accumulate and form an end-thrust on the shaft because it would easily pass through the bearings 15 and 16 to atmosphere. As a result the springs 27 may be made comparatively light and the friction at the joint between the shoulders 25 and the sealing rings 26 will be comparatively slight, actually growing less as the fluid pressure rises and increasingly opposes the spring pressure on the sealing rings.

Suitable means (not shown) may be provided for lubricating the bearings 15 and 16.

The structure shown in Fig. 2 differs from that described above mainly in the fact that the bearings supporting the shaft are exposed to the pressure in the crank case and are lubricated by the fluid in the crank case while the sealing means are provided outside of the bearings.

In this construction, a crank case 35 is provided with bearings 36 and 37 disposed respectively in opposite end walls of the crank case. For convenience in assembly the bearing 37 is actually formed in a bearing block 38 bolted to the crank case. A drive shaft 39 passes through the crank case and is journaled in said bearings. This drive shaft is formed with a pair of eccentrics 40 which are engaged by straps 41 carried by connecting rods 42. These rods are connected in the usual manner to the pistons (not shown).

Outside the bearings 36 and 37 the shaft 39 is reduced in diameter forming opposed outwardly facing shoulders 44. A sealing ring 45 is pressed against each shoulder by a coil spring 47 surrounding the shaft. Each ring 45 is connected to the inner end of a metal bellows 48 with a fluid-tight joint. The outer end of each bellows is clamped fluid-tight between the outer face of the crank case (the bearing block 38 being considered in effect a part of the crank case) and a plate 49. A nipple 50 threaded through each plate 49 bears against the outer end of the adjacent spring 47 and provides means for adjusting the pressure of said spring on the sealing ring. A jam nut 51 on each nipple serves to hold the same at the desired adjustment.

In operation, fluid under pressure developed within the crank case 35, will find its way through the bearings 36 and 37, but it cannot continue along the shaft because of the fluid seal between shoulders 44 and rings 45. The fluid pressure tends to collapse the bellows and force the rings away from the shoulders, but the springs 47 are adjusted to counterbalance the maximum thrust imposed by the fluid. Since the fluid pressure is balanced there will be no end-thrust tending to produce axial displacement of the shaft 39. The higher the pressure in the crank case the more nearly will it counterbalance the spring pressure and the less friction will be developed between the sealing disks and the shoulders 44. The shaft is virtually floated endwise between the spring-pressed sealing rings, and the bearings 36 and 37 are kept lubricated by the fluid in the crank case.

While I have described two embodiments of my invention it will be understood that these are to be taken as illustrative and not limitative, and that I reserve the right to make various changes in form, construction and arrangement of parts without departing from the spirit and scope of the following claims.

I claim:

1. In combination, a casing, a shaft rotatable therein and exposed at opposite ends of the casing to a pressure different from that within the casing, a pair of end-thrust bearings for the shaft resiliently mounted on the casing at opposite ends thereof, each bearing forming a fluid tight seal with the shaft and being hermetically sealed to the adjacent wall of the casing, said bearings being so constructed and arranged that they maintain a substantially uniform sealing pressure irrespective of relative pressure conditions within and without the casing and act to balance the end thrust of the shaft.

2. In combination, a casing forming a compression chamber and having a pair of opposed openings, a rotatable shaft passing through said openings and exposed at opposite ends of the casing to the outside atmosphere, a pair of opposed end-thrust bearings disposed adjacent said openings respectively, each bearing forming a fluid tight seal with the shaft, a resilient backing for each bearing, and flexible means hermetically sealing each bearing to the casing about the adjacent opening, said bearings being so constructed and arranged that they maintain a substantially uniform sealing pressure irrespective of pressure conditions in the chamber and act to balance the end thrust of the shaft.

3. In combination, a casing forming a compression chamber, a pair of journals disposed respectively in opposite walls of the casing, a shaft rotatable in said journals and exposed to atmospheric pressure at opposite ends of the casing, a pair of opposed end-thrust bearings for the shaft located adjacent said journals respectively, each thrust bearing forming a fluid-tight seal with the shaft, and a resilient support for each thrust bearing hermetically sealing the same to the casing, said bearings being so constructed and arranged that they maintain a substantially uniform sealing pressure irrespective of pressure conditions in the chamber and act to balance the end thrust of the shaft.

4. In combination, a casing forming a compression chamber, a pair of journals disposed respectively in opposite walls of the casing, a shaft rotatable in said journals and exposed to atmospheric pressure at opposite ends of the casing, said shaft being formed with a pair of annular shoulders facing outwardly toward the journals respectively, sealing means comprising bearing rings freely slidable on the shaft and bearing against said shoulders respectively, and a resilient support for each ring providing a hermetic seal between the ring and the casing, said sealing means being so constructed and arranged that they maintain a substantially uniform sealing pressure irrespective of pressure conditions in the chamber and act to balance the end thrust of the shaft.

5. In combination, a casing forming a compression chamber, a pair of journals disposed respectively in opposite walls of the casing, a shaft rotatable in said journals and exposed to atmospheric pressure at opposite ends of the casing, said shaft being formed with a pair of annular shoulders facing outwardly away from the journals respectively, sealing means comprising bearings ring freely slidable on the shaft and bearing against said shoulders respectively, and a resilient support for each ring providing a hermetic seal between the ring and the casing, said sealing means being so constructed and arranged that they maintain a substantially uniform sealing pressure irrespective of pressure conditions in the chamber and act to balance the end thrust of the shaft.

THOMAS I. POTTER.